United States Patent
Khojastepour et al.

(10) Patent No.: US 11,122,573 B2
(45) Date of Patent: Sep. 14, 2021

(54) ROBUST BEAM TRACKING AND DATA COMMUNICATION IN MILLIMETER-WAVE MOBILE NETWORKS

(71) Applicant: NEC Laboratories America, Inc., Princeton, NJ (US)

(72) Inventors: Mohammad Khojastepour, Lawrenceville, NJ (US); Shahram Shahsavari, Brooklyn, NY (US)

(73) Assignee: NEC Corporation

( * ) Notice: Subject to any disclaimer, the term of this patent is extended or adjusted under 35 U.S.C. 154(b) by 139 days.

(21) Appl. No.: 16/515,249

(22) Filed: Jul. 18, 2019

(65) Prior Publication Data
US 2020/0037304 A1 Jan. 30, 2020

Related U.S. Application Data

(60) Provisional application No. 62/711,827, filed on Jul. 30, 2018.

(51) Int. Cl.
*H04W 72/04* (2009.01)
*H04W 4/029* (2018.01)

(52) U.S. Cl.
CPC ......... *H04W 72/048* (2013.01); *H04W 4/029* (2018.02)

(58) Field of Classification Search
CPC ............................ H04W 72/048; H04W 4/029
See application file for complete search history.

(56) References Cited

U.S. PATENT DOCUMENTS

| | | | |
|---|---|---|---|
| 2014/0185481 A1* | 7/2014 | Seol ...................... | H04W 52/24 370/252 |
| 2015/0230263 A1* | 8/2015 | Roy .................... | H04W 64/003 455/452.2 |
| 2017/0212210 A1* | 7/2017 | Chen ........................ | G01S 5/06 |
| 2017/0223552 A1* | 8/2017 | Roy ................ | H04W 36/00837 |
| 2019/0166563 A1* | 5/2019 | Ansari ................ | H04B 7/0617 |
| 2019/0364492 A1* | 11/2019 | Azizi ................ | H04W 52/0264 |

OTHER PUBLICATIONS

Muddassar Hussain et al "Throughput optimal beam alignment in millimeter wave networks", 2017 Information Theory and Applications Workshop (ITA), Aug. 31, 2017, see abstract, pp. 1-5 and figure 2.

Minkyong Kim et al. "Extracting a mobility model from real user traces", Proceedings IEEE Infocom 2006, 25th IEEE International Conference on Computer Communications, Apr. 10, 2007, See sections 1-3, 7.

(Continued)

*Primary Examiner* — Habte Mered
(74) *Attorney, Agent, or Firm* — Joseph Kolodka

(57) ABSTRACT

Systems and methods for robust beam tracking and data communication data are provided. The method includes dividing, by a base station, time into frames each having two phases, a location probing phase and a data communication phase. In the location probing phase, the base station uses a fractional search policy to localize a mobile device by transmitting multiple probing packets over different time-slots and updates information about a location of the mobile device. In the data communication phase, the base station communicates with the mobile device while expanding a beamwidth to compensate for possible mobility of the mobile device.

18 Claims, 9 Drawing Sheets

(56) References Cited

OTHER PUBLICATIONS

Yu Zhang et al., "Energy efficient optimization for full-duplex assisted closed-loop MISO downlink transmission", 2016 IEEE 27th Annual International Symposium on Personal, Indoor and Mobile Radio Communications (PIMRC), Dec. 22, 2016, See abstract and section 1.
Hussain, "Throughput Optimal Beam Alignment in Millimeter Wave Networks", arXiv:1702.06152, Feb. 2017, 7 pages.

\* cited by examiner

TABLE 700

| Parameter | Value |
|---|---|
| Distance $d$ | 50 m |
| Probing time-slot duration $\tau$ | 2 msec |
| Maximum linear velocity $v_{max}$ | 1 – 30 m/sec |
| Frequency | 60 GHz |
| Bandwidth $W$ | 2 GHz |
| BS transmit power $P$ | 10 – 20 dBm |
| Noise spectral density $N_0$ | -174 dBm/Hz |
| Pathloss $L(d)$ (in dB) | $68 + 20 \log_{10}(d \text{ in m})$ |

FIG. 7

ROBUST BEAM TRACKING AND DATA COMMUNICATION IN MILLIMETER-WAVE MOBILE NETWORKS

RELATED APPLICATION INFORMATION

This application claims priority to U.S. Provisional Patent Application No. 62/711,827, filed on Jul. 30, 2018, incorporated herein by reference herein its entirety.

BACKGROUND

Technical Field

The present invention relates to millimeter-wave (mmWave) spectrum devices and more particularly to beam tracking in millimeter wave mobile networks.

Description of the Related Art

Millimeter-wave (mmWave) spectrum (transmissions in the range of 30 GHz-300 GHz (Gigahertz)) offers an order of magnitude greater bandwidth for wireless communications which can be utilized to provide multi-Gbps (gigabits per second, billions of bits per second) data rates. Although high path-loss and severe shadowing attenuate signal power intensely in mmWave frequencies, various beamforming (BF) techniques have been implemented to overcome these effects by forming directional radiation patterns (beams) using massive antenna arrays.

SUMMARY

According to an aspect of the present invention, a method is provided for robust beam tracking and data communication data. The method includes dividing, by a base station, time into frames each having two phases, a location probing phase and a data communication phase. In the location probing phase, the method includes using a fractional search policy to localize a mobile device by transmitting multiple probing packets over different time-slots and updating information about a location of the mobile device. In the data communication phase, the method includes communicating with the mobile device while expanding a beamwidth to compensate for possible mobility of the mobile device.

According to another aspect of the present invention, a system is provided for robust beam tracking and data communication data. The system divides, by a base station, time into frames each having two phases, a location probing phase and a data communication phase. In the location probing phase, the base station uses a fractional search policy to localize a mobile device by transmitting multiple probing packets over different time-slots and updating information about a location of the mobile device. In the data communication phase, the base station communicates with the mobile device while expanding a beamwidth to compensate for possible mobility of the mobile device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 7 is a block diagram illustrating a simulation parameters table, in accordance with the present invention;

DETAILED DESCRIPTION OF PREFERRED EMBODIMENTS

In accordance with the present invention, systems and methods are provided for robust beam tracking and data communication. The systems and methods implement a strategy in which the base station does not have (or does not use) the details of the user mobility model. Time is divided into frames each including two phases: i) location probing and ii) data communication. In the first phase, the base station uses a fractional search policy to localize the user by transmitting multiple probing packets over different time-slots and update information (for example, stored by the base station) about user location based on the user feedback. In the second phase, the base station starts data communication with the user while expanding the beamwidth to compensate for possible user mobility. The systems provide a steady state analysis of the performance and formulate an optimization problem to obtain optimal frame structure maximizing steady state average throughput.

In one embodiment, an optimal location probing duration of one timeslot is used while optimal data communication duration can be obtained using quasi-concave programming.

Figure 1:
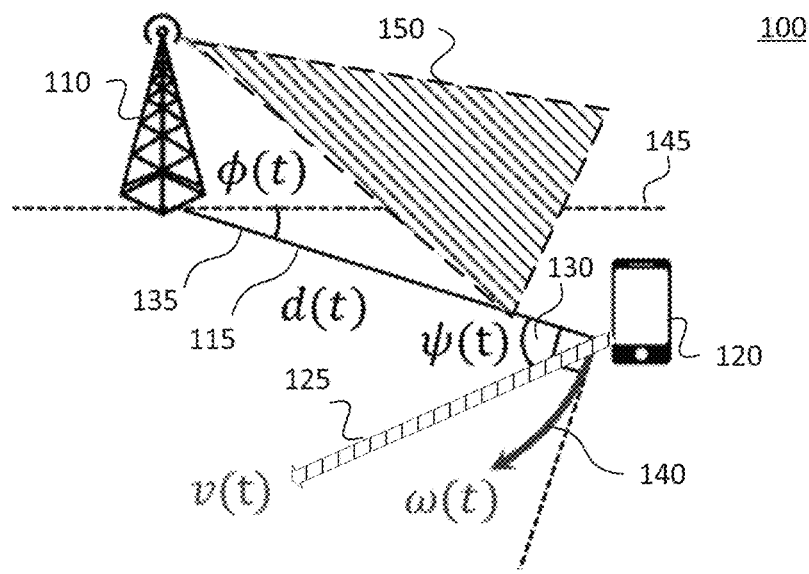
FIG. 1 is a block diagram illustrating a point-to-point mmWave link between a BS and a mobile device, in accordance with the present invention.

Referring now in detail to the figures in which like numerals represent the same or similar elements and initially to FIG. 1, a system 100 including a point-to-point mmWave link between a BS and a mobile device is illustratively depicted in accordance with one embodiment of the present invention.

As shown in FIG. 1, the downlink 115 of a two-dimensional single cell system 100 in which the base station (BS) 110 communicates with a mobile device (user) 120 through a point-to-point mmWave link. FIG. 1 depicts the system 100 in which the methods and processes described herein can be implemented. Let d(t) 115 denote the distance between the BS 110 and the mobile device 120 at time t. Furthermore, let v(t) 125 and ψ(t) 130 denote the magnitude and direction of the user velocity at time t, respectively. The system 100 assumes (operates on an assumption) that v(t) 125 and ψ(t) 130 are not known at the BS 110, and are considered as random variables with arbitrary probability distribution in [0; v max] and [0; 2π], respectively, where v max is the maximum user velocity. The angular position 135 of the mobile device 120 relative to (for example, the horizontal axis 145 of) the BS 110 at time t is denoted by φ(t) 2 [0; 2π]. Moreover, the angular velocity of the mobile device 120 with respect to the BS 110 is defined as ω(t)=v(t) sin (t)=d(t). Further, ω(t)≥0 for (t) 2 [0; π] (clockwise rotation) and ω(t)≤0 for (t) 2 [π; 2π] (counterclockwise rotation).

According to an example embodiment, the BS 110 includes a massive antenna array, such as an array applicable for implementing mmWave communications. The system 100 adopts a simplified antenna pattern model to model the directionality of the BS transmission pattern due to the beamforming (BF) 150. The simplified antenna pattern model can include three parameters: main-lobe gain G, beamwidth θ, and angular coverage region Θ which is the angular region covered by the main-lobe of the transmission pattern. In this instance, Θ=|Θ|. Furthermore, the system 100 neglects (for example, ignores) the effect of the side-lobes for theoretical tractability. In this model, energy conservation implies that:

$$G = \frac{2\pi}{\theta}.$$ Equation (1)

Let G(t), θ(t), and Θ(t) be the beamforming gain, beamwidth, and angular coverage region at time t, respectively. Moreover, the system operates on an assumption that the mobile device 120 has an omni-directional transmission and reception pattern.

Although individual mmWave radios can perform BF to create directional transmission patterns, any misalignment between transmitter (TX) and receiver (RX) beam patterns can diminish the BF gain required for a high data-rate mmWave link. Moreover, the sensitivity to beam misalignment increases as TX and RX beams get narrower. In such scenarios, even a slight misalignment can fade the signal away completely. For example, 18° misalignment reduces the received power by around 17 dB when using 7° beams at 60 GHz. The systems and methods minimize extra communication and delay overhead (thereby minimizing reduced efficiency) for beam alignment. The systems and methods provide efficient and precise beam alignment techniques that provide significant BF gains to support mmWave communications.

Figure 2:
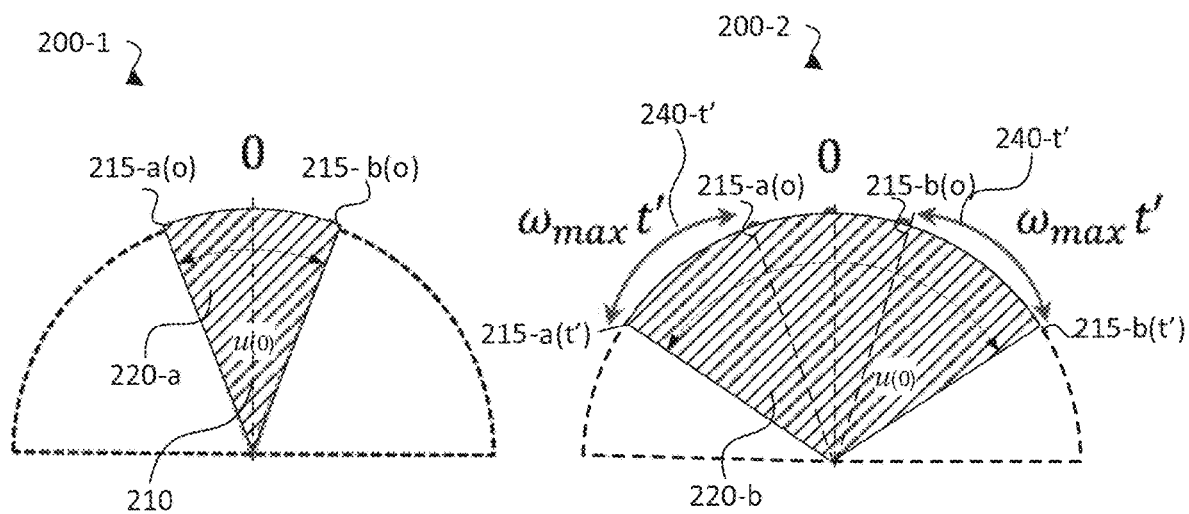
FIG. 2 is a block diagram illustrating expansion of angular uncertainty region over time due to the user mobility, in accordance with the present invention.

Referring now to FIG. 2, an expansion of angular uncertainty region over time due to the mobile device 120 mobility is illustratively depicted in accordance with an embodiment of the present invention.

As shown in FIG. 2, at 200-1, corresponding to a first instant for example, t=0) of measurement (a), the angular uncertainty region (AUR) 220 (at that instant 220-a) is bounded within position (a) t=0, (215-a(0)) and position (b) (215-b(0)). The vertical line 210 is the angular origin, for example, φ=0. 200-2 illustrates an instant of measurement later than at first instant of measurement 200-1. Later, at 200-2 (for example, t=t'), corresponding to the instant of measurement (b), the angular uncertainty region (AUR) 220-b (is bounded) within positions (a) t=t', (215-a(t')) and (b) t=t' (215-b(t')). As can be seen by comparing AUR 220-a with AUR 220-b, the size of the angular uncertainty region increases (over time) with mobility of the user device 120.

Highly directional transmission patterns (beams) obtained by beamforming techniques at the BS 110 can be implemented for communication over mmWave bands to overcome high pathloss and severe shadowing. In order to maintain the connection while using directional (narrow) beams, the systems and methods allow the BS 110 to track the mobile device's 120 angular position φ(t) while the mobile device 120 moves. In instances in which the user device mobility model including instantaneous velocity and direction of movement is precisely known at the BS 110 in a real-time manner, the BS 110 can track the user in a straightforward manner. The systems and methods can be applied in instances in which it is not practical (or, for example, selected, implemented, possible, etc.) for the BS 110 to have the user device mobility model in a real time manner (for example, due to the extra overhead and system complexity). In the example embodiments, BS 110 estimates $v_{max}$ and d(t) accurately using, for example, global positioning system (GPS) and low frequency channels. Although the estimated information in some instances is not enough for precise localization, the systems and methods use this estimated information to reduce the uncertainty on the user's angular position as described herein below.

To model the uncertainty on the user position, the systems and methods define the concept of angular uncertainty region as follows: (Definition 1 is that) the angular uncertainty region (AUR) on user's (mobile device's 120) location at time t, denoted by Φ(t), is the shortest angular interval [a(t); b(t)], such that the BS 110 knows (for example, has information regarding) φ(t) 2 Φ(t) with probability 1. Furthermore, the length of uncertainty region is defined as u(t) ≜ Φ(t)|=b(t)−a(t). This is referred to herein below as definition 1.

According to the definition 1, if the BS 110 matches a transmission pattern of the BS 110 to the AUR 220 during data transmission (for example, if Θ(t)=Φ(t)), the connection will be maintained with probability 1. Let t=0 be the time origin. Moreover, let t0>0 be small enough such that d(t) is approximately constant over time interval [0; t0], for example, d(t)≈d; t∈[0, t']. In this instance, w(t)∈ [$w_{max}$, −$w_{max}$]; t∈[0; t0], where $w_{max}$=$v_{max}$/d (240) is the magnitude of the maximum user (device) angular velocity relative to the BS 110. Note that the systems consider ψ=π/2 (for example, a worst case) in calculating $w_{max}$ 240. Without tracking, AUR 220 expands over time due to the possibility of user (and corresponding device 120) mobility. Using definition 1, the systems determine that if $\Phi(0)=[a(0); b(0)]$, then $\Phi(t0)=[a(t0); b(t0)]$, where:

$$a(t')=a(0)-w_{max}t' \quad \text{Equation (2)},$$

$$b(t')=b(0)+w_{max}t' \quad \text{Equation (3)},$$

$$u(t')=u(0)+2w_{max}t' \quad \text{Equation (4)}.$$

FIGS. 2 (200-1 and 200-2) illustrates the expansion of AUR 220 without beam tracking over time. As shown in comparison between 200-1 at a first time and 200-2 at a second time, AUR 220 expands from both sides since the BS 110 does not know (for example, does not have information regarding) the direction of mobility.

Figure 3:
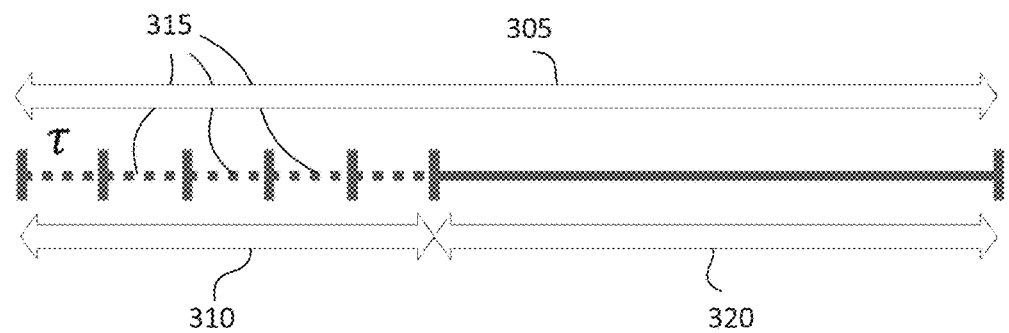
FIG. 3 is a block diagram illustrating frame structure in beam tracking, in accordance with the present invention.

Referring now to FIG. 3, a frame structure in beam tracking is illustratively depicted in accordance with an embodiment of the present invention.

FIG. 3 represents beam tracking and data communication. Equation (4), described with respect to FIG. 2 hereinabove, implies that the BS 110 should expand its transmission beamwidth $\theta(t)$ with the rate of $2w_{max}$ during data transmission to maintain the connection with probability 1. However, this will lead to a low beamforming gain G(t) after a long time according to Equation (1). In order to avoid low beamforming gains (wide beams), the BS 110 localizes the mobile (user) device 120 intermittently which enables the use of sufficiently narrow beams while maintaining the connection reliably. The connection can be maintained to a predetermined reliability (for example, based on Equation (4).

According to example embodiments, the BS 110 uses mmWave cellular service to localize the user and reduce AUR 220 when the AUR 220 exceeds a predetermined or approximate size (for example becomes too large, exceeds a threshold, etc.) due to data communication. The system divides time into similar frames. FIG. 3 illustrates the structure of a frame 305 consisting of two phases: 1) location probing phase (LPP) 310 and 2) data communication phase (DCP) 320.

According to an example, the system identifies a frame 305 and the AUR 220 at the beginning of the frame 305. In the first phase (LPP) 310, the BS 110 probes the AUR 220 to localize the user device 120 while considering that AUR 220 expands due to user (device 120) mobility. LPP 310 consists of K∈N time-slots 315 each with duration $\tau$. At the beginning of each time-slot 315, the BS 110 transmits a probing packet while matching an angular coverage region (of the BS 110) to a fraction of AUR 220 at the end of the time-slot 315. Then, the BS 110 updates the AUR 220 based on feedback from the mobile device 120 (for example, the user feedback) which is either an acknowledgement packet (ACK) or no packet (NACK). Receiving an ACK from the mobile device 120 implies that the mobile device 120 has been in the angular coverage region used for probing packet transmission during that timeslot and NACK means otherwise. The BS 110 can in some instances interpret no packet (being received) as the mobile device 120 not being in (or not having been in) the angular coverage region.

After LPP 310, in the second phase (DCP) 320, the BS 110 matches an angular coverage region (of the BS 110) to the most updated AUR 220 and starts data communication while expanding the beamwidth continuously in time according to Equation (4). Although DCP 320 is not time-slotted in this example embodiment, the system assumes (operates on an assumption) that the duration of DCP 320 is $D\tau$ with $D \in R^+$ and for the purpose of clarity, simplifying the explanations and expressions herein, this notation is used below). The system determines that the frame length is $N\tau$, where $N=K+D$.

As described herein below, each phase is presented in detail with an analysis of the variation of AUR over time when using two-phase structure described herein above.

Figure 4:
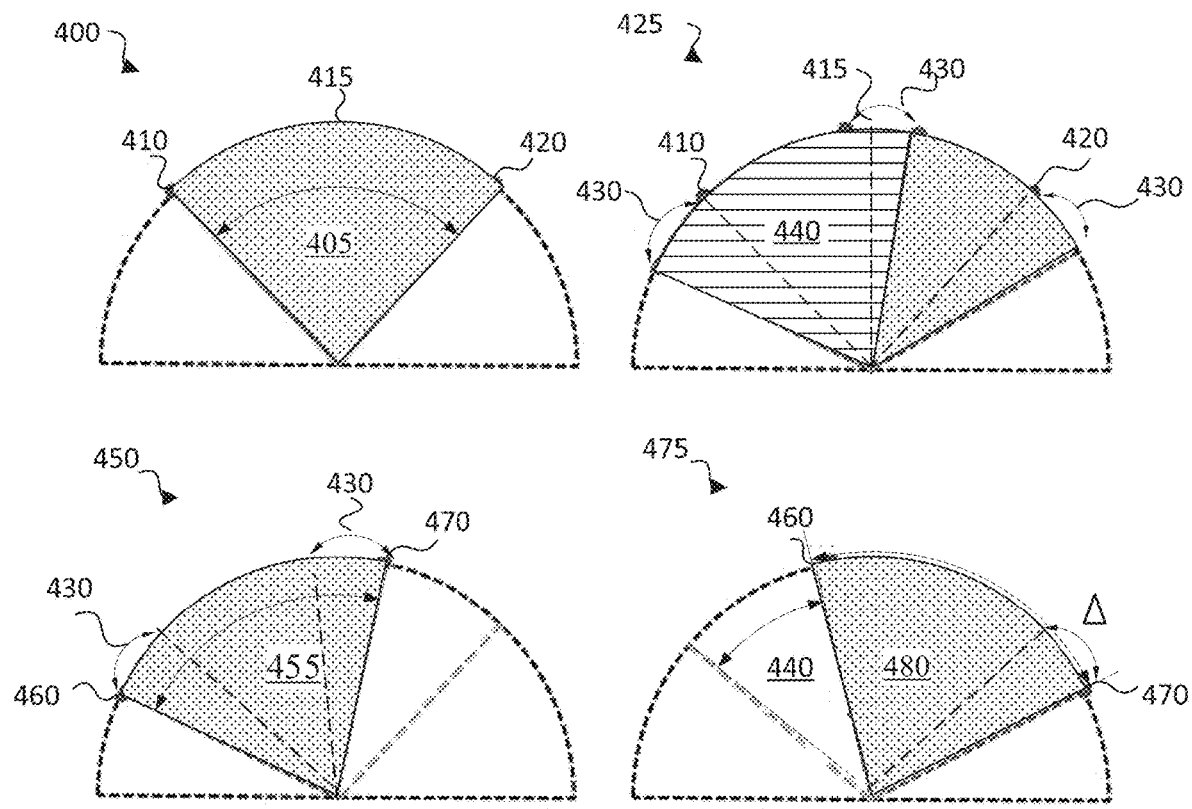
FIG. 4 is a block diagram illustrating location probing at a generic time-slot m during a location probing phase (LPP), in accordance with the present invention.

Referring now to FIG. 4, location probing at a time-slot m during a location probing phase (LPP) is illustratively depicted in accordance with an embodiment of the present invention.

As shown in FIGS. 4, 400, 425, 450 and 475 represents stages during location probing procedure at a generic time-slot m during LPP 310.

At 400, the region 405 represents the AUR 220 at the beginning of the time-slot, for example, $\Phi m-1$ ($u_m$). The AUR 220 at the beginning of the time-slot is bounded by $a_{m-1}$ (410) and $b_{m-1}$ (420), with a central position of $c_{m-1}$ (410). At 425, the BS 110 transmits a probing packet while matching a transmission pattern (of the BS 110) to a selected region 440 which is $\Theta m$ ($\xi m$). At 450, if the user (mobile device 120) sends back an ACK, then the ACK is transmitted in region 455 and the BS 120 updates the AUR 220 accordingly. At 475, if the mobile device does not send back an ACK, then the mobile device 120 is in the region 480 and the BS 110 updates the AUR 220 accordingly.

The system implements (for example, a goal of) LPP to reduce the uncertainty on the user angular location enabling the use of (for example, using a predetermined width or threshold) narrow beams. As described before, LPP 310 consists of K time-slots at each of which the BS 110 transmits a probing packet and updates the AUR 220 based on the (user) response (from the mobile device 120). The duration of each time-slot, $\tau$, is the time required for transmitting the probing packet and receiving user response. Since LPP 310 is time-slotted, the system defines $\Phi m \triangleq \Phi(m\tau)$, $am \triangleq a(m\tau)$, $bm \triangleq (m\tau)$, $um \triangleq u(m\tau)$, and $\Theta m \triangleq (m\tau)$ for notational brevity, where $m=0; 1; \ldots; K$. Note that $m=0$ corresponds to the initial value at the beginning of LPP 310.

According to example embodiments described herein, the system implements a family of probing strategies herein referred to as onward fractional search (On-FS), as described herein below with respect to process 1. Onward fractional search probes a fraction of the AUR at the end of the time-slot m without probing [for example, $a_{m-1}-\Delta$; $b_{m-1}+\Delta$]. In other words, at each time-slot onward fractional search considers the worst case AUR 220 and probes the worst case AUR 220 to avoid user scape from the updated AUR.

The BS 110 transmits a probing packet with size $\tau 0$ while adjusting a transmission pattern (of the BS 110) to cover angular region (440) $\Theta m$ ($\xi m$)=$[a_{m-1}-\Delta; a_{m-1}+\xi_m+\Delta]$ where $\xi_m \, 2 \, (0; um-1)$; $m=1; 2; \ldots$; K is a design parameter (stage 425, FIG. 4). Note that the AUR 220 is $\Phi m-1$ (405) at the beginning of time-slot $m=1; 2; \ldots$; K (stage 400 of LPP 310, FIG. 4). $\Delta$ (430) can be defined as the maximum change in angular position due to the mobility. The mobile device 120 (user) transmits back an ACK if the mobile device 120 receives the entire probing packet. In this example instance, $\sigma$ is identified as the one-way communication delay between the BS 110 and mobile device 120. Therefore, the BS 110 receives (or is to receive) an ACK if $\varphi(t) \in \Theta m(\xi m)$ for $(m-1)\tau+\sigma \leq t \leq (m-1)\tau+\tau'+\sigma$. On the other hand, the BS 110 is required to update AUR 220 based on user response (from mobile device 120) by the end of the timeslot, hence we should have $\tau 0+2\sigma \leq \tau$. According to an example, the system neglects (for example, disregards) $\sigma$ and assumes that $\tau'=\tau$ (for example, for the sake of simplicity, efficiency, etc.).

However, the system can generalize the results for σ>0 and τ'<τ with minor modifications. Moreover, if the BS 110 does not receive an ACK, the BS 110 interprets the result as NACK.

If the BS 110 receives an ACK, then the mobile device 120 has been in angular region $\Theta_m$ ($\xi_m$) for the entire time-slot, hence AUR 220 is updated as $\Phi_m=\Theta_m(\xi_m)$ (shown as 455) (stage 450, FIG. 4). The region is bounded by $a_m$ (460) and $b_m$ (470). Otherwise, the mobile device 120 has been outside of $\Theta'_m$ ($\xi_m$) at least for a fraction of the time-slot, hence the AUR 220 is updated as $\Phi_m=\Theta'_m$ ($\xi_m$) ≜ [$a_{m-1}+\xi_m$; $b_m-1+\Delta$] (stage 475, FIG. 4). Note that if a NACK happens, the updated AUR 220 still includes a part of the angular region probed, for example, $\Theta_m(\xi_m) \cap \Theta'_m$ ($\xi_m$)= [$a_{m-1}+\xi_m$; $a_{m-1}+\xi_m+\Delta$] because the mobile device 120 can be at the angular position $\varphi=a_{m-1}+\xi_m+\Delta+$ with an arbitrary small $\epsilon$>0 at the beginning of the time-slot and move counterclockwise with maximum angular velocity $w_{max}$. Thus the mobile device 120 reaches angular position $\varphi=am-1+\tau_m+\epsilon$ at the end of time-slot while the mobile device 120 does not send back an ACK since the mobile device 120 has not received the entire probing packet (for example, mobile device 120 misses the first portion of the probing packet). Therefore, $\Theta'_m$ ($\xi_m$) also includes a part of $\Theta_m$ ($\xi_m$) with length $\Delta$ to make sure that the mobile device 120 is located in the updated AUR 220.

To characterize On-FS, the system determines design vector $\xi=[\xi 1; \xi 2; \ldots \xi K]$; The system implements LPP 310 to reduce the length of AUR 220 at the beginning of DCP 320 (or equivalently at the end of LPP 310) to start data transmission with a higher beamforming gain (for example, a narrower beam). Therefore, the system attempts to reduce $u_K$ as much as possible during LPP 310. However, $u_K$ is potentially a random variable whose distribution depends on $\xi$ as well as the user mobility model, for example, probability distribution of user velocity v(t) and mobility direction (t). This is because AUR 220 is updated based on the user feedback which is directly affected by the user mobility model. As the details of user mobility model is assumed to be arbitrary for robustness, the system implements a deterministic approach to find $\xi$ such that the worst case (maximum) of $u_K$ over all mobility models satisfying v(t) 2 [0; $v_{max}$] is minimized.

Therefore, the system implements a process to satisfy the problem:

$$\prod_1 : \xi^* = \underset{\xi}{\arg\min}\ \underset{M}{\max}(u_K(\xi)),$$

subject to: $0 < \xi_m < u_{m-1}, m=1, 2, \ldots, K$.

where M is the set of all mobility models satisfying v(t) 2 [0; $v_{max}$].

According to an example embodiment, the system implements (or determines using) Lemma 1 to solve problem Π1:

$$\xi^*_m = (u_{m-1}-\Delta)/2,\ m=1,2,\ldots,K.$$

Lemma 1 shows that using the optimal vector $\xi^*$ the length of AUR 220 at the end of each time-slot is independent of the user feedback since $|\Theta_m(\xi^*_m)|=|\Theta'_m(\xi^*_m)|$, m=1, 2; ..., K. This implies that um; m=1; 2; ... K is independent of user mobility model when $\xi=\xi^*$ as expected. Furthermore, using $\xi^*$ leads to:

$$u_m = \frac{u_{m-1}}{2} + \frac{3\Delta}{2},\ 1 \le m \le K,\qquad \text{Equation (5)}$$

Equation (5) leads to:

$$u_m = \frac{u_0}{2^m} + 3\Delta\left(1 - \frac{1}{2^m}\right),\ 1 \le m \le K,\qquad \text{Equation (6)}$$

where $u_0$ is the length of AUR 220 at the beginning of LPP 310.

According to an example embodiment, On-FS can be implemented with the following steps.

The system can input an initial AUR 220 in the probing phase $\Phi_0=[a_0; b_0]$. The output is the final AUR 220 in the probing phase $\Phi_K=[a_K, b_K]$.

1: for m=1 to K the system does the following:

2: The BS 110 transmits a probing packet with a beampattern covering the angular region [$a_{m-1}-\Delta$; $a_{m-1}+\xi_m+\Delta$] as illustrated by 425, shown in FIG. 4.

3: if The BS 110 receives an ACK from the mobile device 120 then

4: the AUR 220, illustrated by 450 (FIG. 4), is updated as $$\Phi_m=[a_m,b_m]=[a_{m-1}-\Delta,a_{m-1}+\xi_m+\Delta]\qquad \text{Equation (7)}$$

$$u_m=b_m-a_m=\xi_m+2\Delta\qquad \text{Equation (8).}$$

5: else (if The BS 110 does not receive an ACK from the mobile device 120), 6: the AUR 220, illustrated by 475 (FIG. 4), is updated as $$\Phi_m=[a_m,b_m]=[a_{m-1}+\xi_m,b_{m-1}+\Delta]\qquad \text{Equation (9)}$$

$$u_m=b_m-a_m=u_{m-1}-\xi_m+\Delta\qquad \text{Equation (10).}$$

7: end if (step—for example, 3 through 6). In other words, the if statement in line 3 ends at 7.

8: end for (step—for example, 1). In other words, line 8 indicates an end of the statement started in line 1.

When implementing DCP 320, the BS 110 matches its angular coverage region to the updated AUR 220 from LPP 310, for example, $\Phi_K$, and starts data transmission. To avoid connection loss during data transmission due to user (mobile device 120) mobility, the BS 110 expands the beamwidth to cover AUR 220, for example, $\Theta(t)=\Phi(t)$ for $K\tau \le t \le N\tau$. Thus, the system determines:

$$\theta(t)=u_K+2\omega_{max}(t-K\tau),\ K\tau \le t \le N\tau.\qquad \text{Equation (11)}$$

When implementing a line-of-sight channel model, the average throughput of the frame is:

$$R(K, D, u_0) = \frac{1}{N\tau}\int_{K\tau}^{N\tau} \log_2(1 + SNR(K, D, u_0, t))dt,\qquad \text{Equation (12)}$$

$$SNR(K, D, u_0, t) = \frac{PG(t)}{N_0 WL(d)}.\qquad \text{Equation (13)}$$

where P is the BS 110 transmit power, $G(t)=2\pi=\theta(t)$ is the beamforming gain, $N_0$ is the noise spectral density, W is the communication bandwidth, and L(d) is the pathloss depending on the distance d between the BS 110 and the mobile device 120. Assume that the variation of d is negligible over DCP 320 since the frame length is small in practice. Note that $\bar{R}$ is a function of K, D, and u0. The dependency of $\bar{R}$ on $u_0$ originates from $\theta(t)$ in which $u_K$ depends on $u_0$ according to Equation (6). According to example embodiments, the system uses average throughput as the objective function to optimize the frame structure in the next section.

Figure 5:
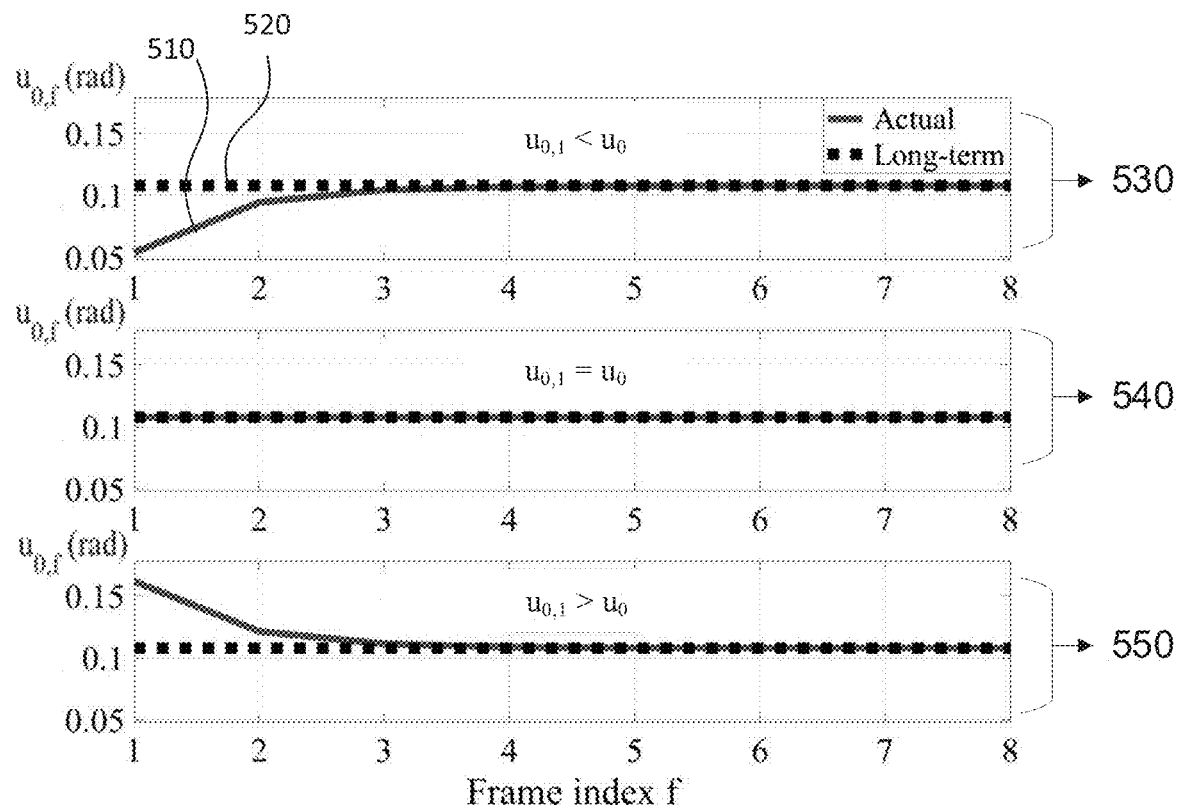
FIG. 5 is a block diagram illustrating the convergence of $u_{o,f}$ to $u_o$, in accordance with the present invention.

Referring now to FIG. 5, the convergence of $u_{0,f}$ (solid curve, 510) to $u_0$ (broken line, 520), is illustratively depicted in accordance with an embodiment of the present invention.

As shown in FIG. 5, the system implements multi-frame analysis and frame optimization. The system analyzes the performance of the described two-phase structure when multiple frames are concatenated. The system also formulates an optimization problem to find the optimal duration of LPP 310 and DCP 320 maximizing steady state average throughput.

The system implements multi-frame analysis based on an assumption that multiple identical frames are concatenated where F denotes the number of the frames. The units on the x-axis, which is the frame index, are natural numbers. The y-axis indicates an angle with radian units.

Referring again to FIG. 5, there is shown a convergence of $u_{0,f}$ (solid curve) to $u_0$ (dotted line) when K=2 and D=100 for three cases: $u_{0,1} < u_0$ (top, 530), $u_{0,1} = u_0$ (middle, 540), and $u_{0,1} > u_0$ (bottom, 550).

Let $u_{m,f}$, $m \in \{1, 2, \ldots K\}$, $f \in \{1, 2, \ldots F\}$ be the length of AUR 220 at the end of time-slot m during LPP 310 in frame f. Furthermore, let $u_{0,f}$, $f \in \{1, 2, \ldots F\}$ be the length of AUR 220 at the beginning of frame f. Note that AUR 220 at the end of frame f is equal to the AUR 220 at the beginning of frame f+1. Accordingly:

$$u_{0,f+1} = \frac{u_{0,f}}{2^K} + 3\Delta\left(1 - \frac{1}{2^K}\right) + 2\Delta D. \qquad \text{Equation (14)}$$

Lemma 2: For any $u_{0,1}$ the sequence $\{u_{0,f}\}_{f \in N}$ converges to:

$$u_0 \stackrel{\Delta}{=} \lim_{f \to \infty} u_{0,f} = 2\Delta\left(\frac{3}{2} + \frac{2^K}{2^K - 1} D\right). \qquad \text{Equation (15)}$$

Lemma 2 states (for example, can be used to determine) an important property of the multi-frame structure. As time proceeds, the length of initial AUR 220 of the frames converges to $u_0$ which is independent of the initial AUR 220 of the first frame, for example, $u_{0,1}$. According to an example implementation, after some initial frames, the transient effect of $u_{0,1}$ fades away and the system enters the steady state approximately. FIG. 5 illustrates this property for three cases: $u_{0,1} < u_0$ (top, 530), $u_{0,1} < u_0$ (middle, 540), and $u_{0,1} > u_0$ (bottom, 550) when K=2 and D=100. As shown, $u_{0,f}$ (solid curve, 510) converges to a limit of the solid curve u0 (dotted line) (for example, quickly, rapidly) in each case.

Using a similar approach as above, the sequence $\{u_{m,f}\}_{f \in N}$ converges for every $m \in \{1, 2, \ldots K\}$.

In the example embodiments that follow, the steady state analysis of the system is considered. In this state, the assumption is that $u_{0,1} = u_0$. The system remains in the steady state (FIG. 5), that is $u_{m,f} = u_{m,f'}$ for any f and f'. Therefore, every frame is similar to the others in terms of the variation of AUR 220. As a result, analysis of a single frame as described hereinbelow can be applied to any of the other frames. Considering Equation (6) with m=K and substituting u0 with its steady state value provided in (15) leads to:

$$u_K = 2\Delta\left(\frac{3}{2} + \frac{D}{2^K - 1}\right). \qquad \text{Equation (16)}$$

where $u_K$ is the AUR 220 at the end of LPP 310 and at the beginning of DCP 320 in steady state. Note that $u_K$ is a function of K and D. Let $\hat{R}(K,D)$ denote the average throughput in the steady state. Using Equations (11)-(13) with steady state $u_K$ provided in Equation (16), the system determines:

$$\hat{R}(K,D) = \frac{1}{N\tau} \int_{K\tau}^{N\tau} \log_2\left(1 + \frac{A}{u_K + 2\Delta\left(\frac{t}{\tau} - K\right)}\right) dt \qquad \text{Equation (17)}$$

$$\text{where } A = \frac{2\pi P}{N_0 W L(d)}.$$

Applying transformation x=t−τ−K and using steady state value of uK provided in (16) we have $$\hat{R}(K,D) = \frac{1}{D+K} \int_0^D \log_2\left(1 + \frac{\hat{P}}{\alpha + \frac{D}{2^K - 1} + x}\right) dx \qquad \text{Equation (18)}$$

$$\text{where } \hat{P} = \frac{A}{2\Delta} \text{ and } \alpha = 3/2.$$

The system determines a closed form expression for $\hat{R}(K,D)$ by taking the integral in Equation (18) as follows $$\hat{R}(K,D) = \frac{1}{(K+D)}\left[\hat{P}\log_2\left(1 + \frac{D}{\frac{D}{2^K-1} + \alpha + \hat{P}}\right) + \right. \qquad \text{Equation (19)}$$

$$\left(\frac{2^K}{2^K-1}D + \alpha\right)\log_2\left(1 + \frac{\hat{P}}{\frac{2^K}{2^K-1}D + \alpha}\right) -$$

$$\left.\left(\frac{D}{2^K-1} + \alpha\right)\log_2\left(1 + \frac{\hat{P}}{\frac{D}{2^K-1} + \alpha}\right)\right].$$

The system implements frame optimization. Increasing number of probing time-slots K leads to a narrower AUR 220 during data transmission according to Equation (11) and Equation (16). Therefore, a higher signal-to-noise ration (SNR) can be achieved in DCP 320 due to the higher beamforming gain which can potentially increase the average throughput. On the other hand, increasing K decreases the fraction of the time spent on data communication $$\left(\text{for example, } \frac{D}{K+D}\right)$$

which can reduce the average throughput. According to an example embodiment, the system determines a tradeoff based on formulating an optimization problem to find optimal values of K and D maximizing steady state average throughput $\hat{R}(K,D)$ provided in Equation (19).

The problem is formulated as:

$$\prod\nolimits_2 : (K^*, D^*) = \underset{K \in N, D \in R+}{\operatorname{argmax}} \hat{R}(K,D).$$

The system solves optimization problem Π2 in two steps: i) the system proves that K*=1, and ii) we find D* while assuming K=K*=1:

Process 1 identifies the optimal value of K is K*=1.

The system compares the case (K,D) with the case (1, D/K) and determines that the latter outperforms the former. Intuitively, this means that given parameters τ, v max, and A, there is an optimal value for D=K which is the fraction of the time spent on data communication to the time spent on location probing.

Using process 1, the system can simplify problem Π2 as follows.

$$\prod\nolimits_3: D^* = \underset{D \in R+}{\mathrm{argmax}} \hat{R}(1, D).$$

To solve this problem, the system first determines that the objective function, $\hat{R}(1,D)$, is strictly quasi-concave with D on the domain.

Process 2 identifies that $\hat{R}(1,D)$ is a strictly quasi-concave function of D on $\mathbb{R}^+$ and there exists a unique $D^* \in \mathbb{R}^+$ at which $\hat{R}(1,D)$ takes its maximum value.

Process 2 implies that problem Π3 is quasi-concave. Moreover, problem Π3 is a one-dimensional optimization problem, hence a simple one-dimensional bisection method can be applied to find D* with logarithmic numerical complexity.

The BS 110 obtains an optimal data communication duration using quasi-concave programming. Quasi concave programming can be implemented to determine a unique solution that is the optimal solution in this instance.

Figure 6:
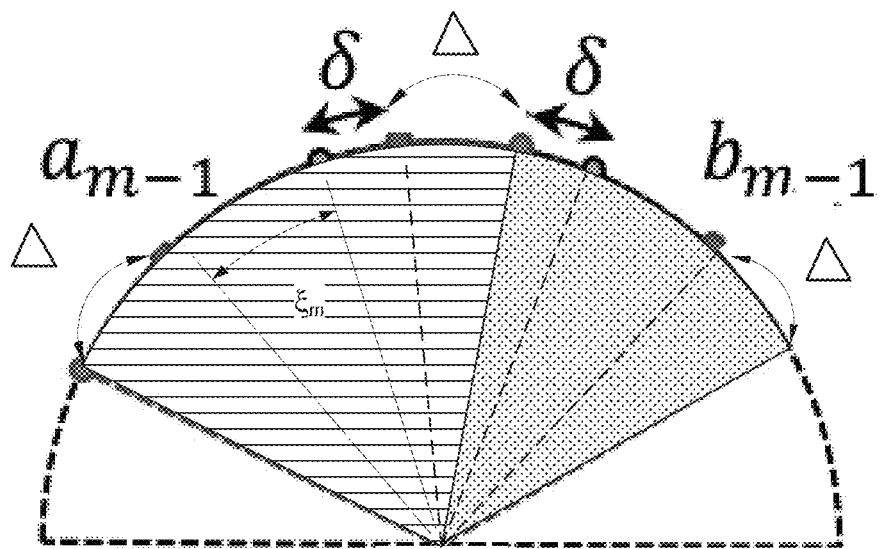
FIG. 6 is a block diagram illustrating generalized onward fractional search for scenarios with communication delay, in accordance with the present invention.

Referring now to FIG. 6, a generalized onward fractional search for scenarios with communication delay is illustratively depicted in accordance with an embodiment of the present invention.

The communication delay denoted by delta in FIG. 6 can be implemented to further expand the AUR, as illustrated by FIG. 6.

One of the main approaches in millimeter wave systems is the use of large number of antennas in order to employ beamforming and generate beamwidths that are small. As a result, highly directional beams may be used to increase the transmission range and the average throughput. However, there is minimum beamwidth that can be realized in practice which is a function of the size of the antenna array including the number of antenna elements as well as its dimension. There is also a resolution of the changes in the beamwidth between two different beams that is not only a function of the size of the antenna array, but also a function of the number of elements that can be dynamically controlled. For example, some deployments use antenna array that is not fully controllable but are partially controllable in the azimuth direction and not in the elevation direction. Another example are the systems in which the gains are dynamically controlled over a set of beams in a codebook.

Both the resolution between the beams and the minimum beamwidth affect the design of the systems in the example embodiments. For example, the systems, in an instance in which a minimum beamwidth θ is assumed, determine that the optimal solution for the data transmission duration may not conform with such requirement. The following lemma provides the optimal frame structure with minimum beamwidth constraint.

Lemma 3. If there is minimum constraint on the beamwidth θ, for example, if $\theta \geq \theta_{min}$, then the solution of problem Π1 is K*=1 and $D^*=\max\{D^*_1, D^*_2(\theta_{min})\}$ where $D^*_1$ is the solution of problem Π3 and $$D^*_2(\theta_{min}) = \frac{\theta_{min}}{2\Delta} - \alpha.$$

The minimum length of AUR 220 increases with D at the end of LPP 310.

MmWave systems often realize large number of antennas required to obtain reasonably small beamwidth as external components outside the baseband unit (BBU) where the beamforming coefficients may be changed at particular interval. The external antenna systems are often referred to as adaptive antenna systems (AAS) due to possible flexibility of beamforming and partial or full control of the beamforming coefficients. AAS is usually connected to BBU through a fiber connection with a limited capacity which may carry entire uplink and downlink data as well as various control signals that are required to be exchanged between AAS and BBU. On the other hand, changing beamforming coefficients very frequently can impose a large overhead to the communication link between BBU and AAS. As a result, in practice, the beams of AAS can only be (for example, is) changed in specific (for example, particular) times that are often realized as multiples of a given time interval. Hence the assumption of continuously increasing transmission beamwidth during DCP 320 is not practical. To model this restriction, the system assumes that both LPP 310 and DCP 320 are time-slotted and the beam pattern can only be changed at the beginning of each time-slot with duration T. Note that this assumption does not change LPP 310 since it was already time-slotted. However, this assumption changes DCP 320 since DCP 320 was not time-slotted before. As a result, D should be an integer and beam pattern can only be modified at the beginning of each time-slot. Therefore, at each timeslot during DCP 320, the BS 110 has to use the beamwidth equal to the length of AUR 220 at the end of the time slot to have a reliable communication. Using this modification, the average throughput is:

$$\tilde{R} = \frac{1}{D+K} \sum_{m=K}^{D+K} \log_2\left(1 + \frac{A}{u_K + 2\Delta(m-K)}\right).$$ Equation (20)

where $u_K$ is given by Equation (16) in steady state. $\tilde{R}$ approaches $\hat{R}$ defined in Equation (17) as τ→0.

There is a minimum size for a packet TO because the packets are required to include particular preamble, and control signals such as the address of the transmitter and intended receiver beside their payload. Since there is no data communication during LPP 310, it is more efficient to use the smallest packet size. On the other hand, a reply to the probing packet from the user would take a seconds which means that the process of probing with a single packet takes at least τ'+σ which should be upper rounded to the nearest integer multiple of τ.

Due to quantization of the time for changing the beamforming coefficients, the assumption of continuous transmission time does not hold anymore. The packet may include any multiples of τ where only at each such time interval the beamforming coefficients may be altered.

According to an example embodiment, under particular conditions a cycle containing two frame structures with (k, D)=(1, 12) and (1, 13) outperforms a single frame structure with either of (1, 12) or (1, 13).

The quantized version of process 1 may be derived as follows. Let a cycle be defined as an ordered collection of multiple frames each with a pair of the probing length and data transmission duration of $(K_i, D_i)$, where the cycle consisting of c frames may be denoted as $[(K_1, D_1), (K_2, D_2), \ldots, (K_c, D_c)]$. The data communication durations of any two frames in the optimal steady state cycle may not differ by more than one time slot duration $\tau$, for example, $|D_i-D_j| \leq 1$. Let $K = \sum_{i=1}^{c} K_i$, $D = \sum_{i=1}^{c} D_i$. Interpretation of this result for quantized case in comparison to the continuous case reveals that instead of having equal length frames (a single frame with (1, D/K) being optimal), the frames may be of different size only by the quantization duration. The example of two frames discussed earlier above herein is in harmony with this notion and provides insight into the structure of the optimal solution.

Referring now to FIG. 7, a simulation parameters table 700 is illustratively depicted in accordance with an embodiment of the present invention.

As shown in FIG. 7, table 700 lists example system parameters 710 that can be used in the simulations. As a benchmark, the system analyses a variation of beam sweeping scheme which supports user mobility based on optimal beam sweeping and communication in mobile millimeter-wave networks.

As can be seen in table 700, the parameters include a distance d (value 50 m), a probing time-slot duration r (value 2 msec), a maximum linear velocity $v_{max}$, a frequency (60 GHz), a bandwidth W (value 2 GHz), a BS transmit power P (value 10-20 dBm), a noise spectral density $N_o$ (value −174 dBm/Hz), and a pathloss L(d) (in dB) (value, 68+20 log 10(d in m)).

Figure 8:
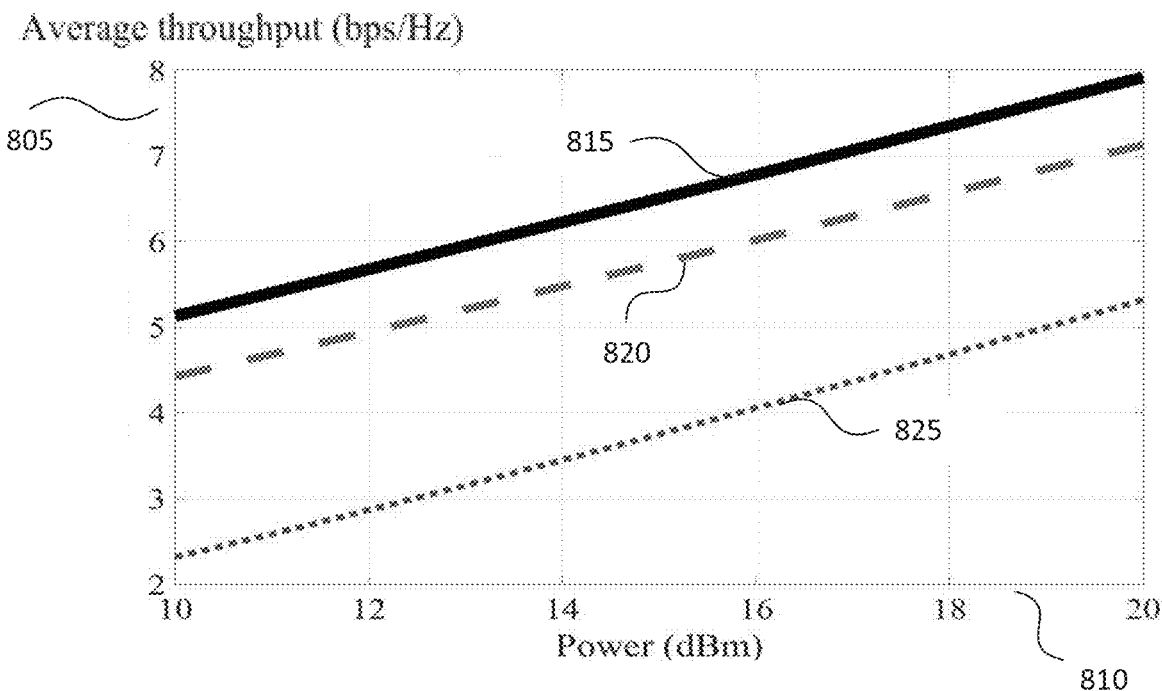
FIG. 8 is a block diagram illustrating average throughput as a function of transmit power, in accordance with the present invention.

Referring now to FIG. 8, average throughput as a function of transmit power is illustratively depicted in accordance with an embodiment of the present invention.

FIG. 8 illustrates the average throughput as a function of BS transmit power when v max=10 m/sec. As shown in FIG. 8, the average throughput (bps/Hz) (805) is compared to transmit power (dBm) (810) for onward bisection 815, beam sweeping 820 and Institute of Electrical and Electronics Engineers (IEEE) 802.11ad (825) (amendment to the 802.11 wireless networking standard).

The processes described herein provide superior results (for example, a higher beam forming gain) when compared to beam sweeping 820. The processes provide greater throughout than beam sweeping. Particularly, the On-FS process described herein reduces the length of AUR 220 more than beam sweeping which enables the BS 110 to use narrower beams leading to a higher beamforming gain. Furthermore, the performance of the processes described herein further provide superior results (for example, compared to systems that use a fixed angle, such as IEEE 802.11ad (825)) as the beams are optimized in the processes described herein.

Figure 9:
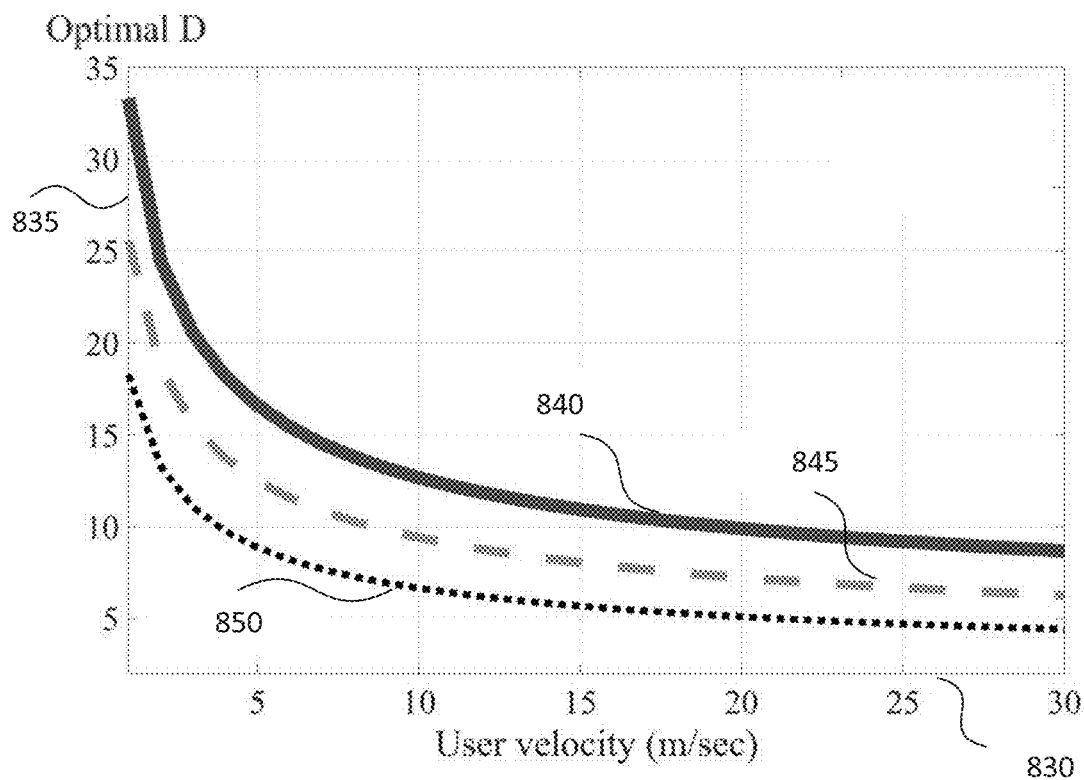
FIG. 9 is a block diagram illustrating optimal data communication phase (DCP) duration normalized by $\tau$ as a function of maximum user velocity, in accordance with the present invention.

Referring now to FIG. 9, an optimal data communication phase (DCP) duration normalized by $\tau$ as a function of maximum user velocity is illustratively depicted in accordance with an embodiment of the present invention.

As shown in FIG. 9, optimal DCP duration normalized by $\tau$ as a function of maximum user velocity 830 for different values of transmit power 810 is illustrated.

In FIG. 9, the optimal DCP duration 835 normalized by $\tau$ (for example, D*) is plotted as a function of maximum user velocity 830 for different values of transmit power P (20 dBm (curve 840), 10 dBm (curve 845) and 0 dBm (curve 850)). The optimal value of D 835 decreases as maximum user velocity 830 increases. The BS 110 is therefore required to perform location probing more frequently when the user (mobile device 120) moves faster. Furthermore, D* increases with increasing P. As the BS 110 increases the beamwidth during DCP 320 to maintain the connection, a larger D* leads to a larger beamwidth and a lower beamforming gain in the end of the DCP 320. However, a higher transmit power can compensate this lower gain and leads to a larger D*.

Figure 10:
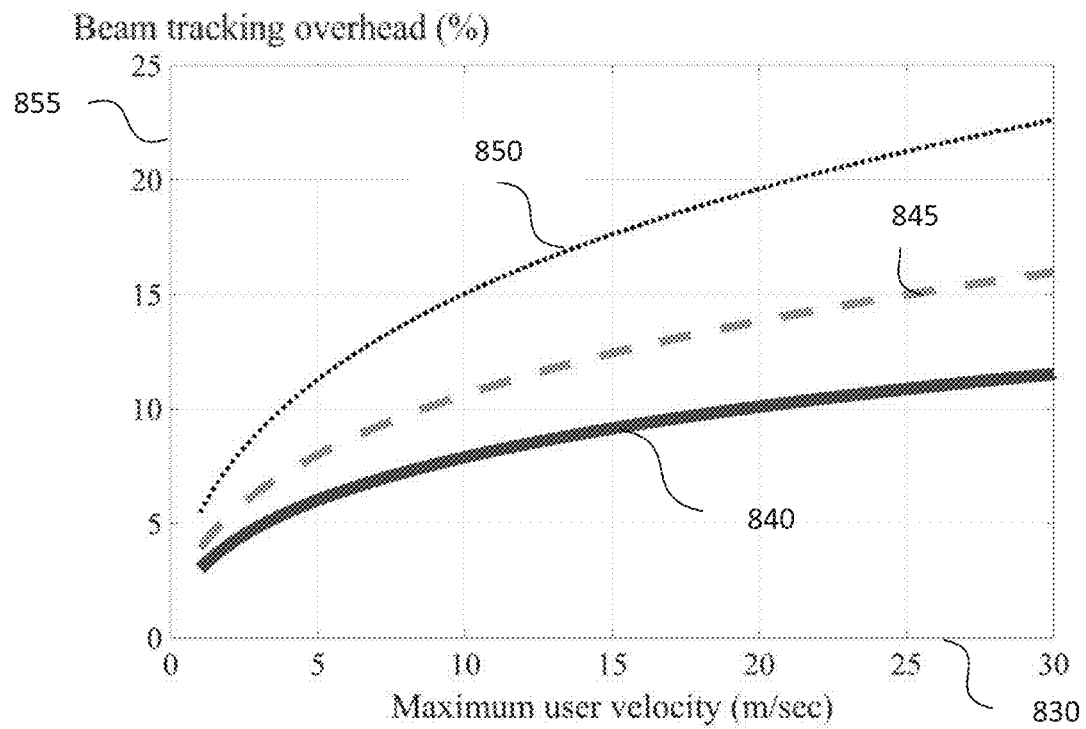
FIG. 10 is a block diagram illustrating overhead of beam tracking as a function of velocity, in accordance with the present invention.

Referring now to FIG. 10, an overhead of beam tracking as a function of velocity is illustratively depicted in accordance with an embodiment of the present invention.

FIG. 10 illustrates beam tracking overhead (%) (855) as a function of maximum user velocity 830 for different values of transmit power P (20 dBm (curve 840), 10 dBm (curve 845) and 0 dBm (curve 850)).

FIG. 10 illustrates BT overhead defined as K*K*+D* where K*=1 according to process 1 (described herein above) and D* is obtained by bisection method. Note that for walking speeds (1-1:5 msec) the overhead of BT in the methods described herein is approximately 5%.

Figure 11:
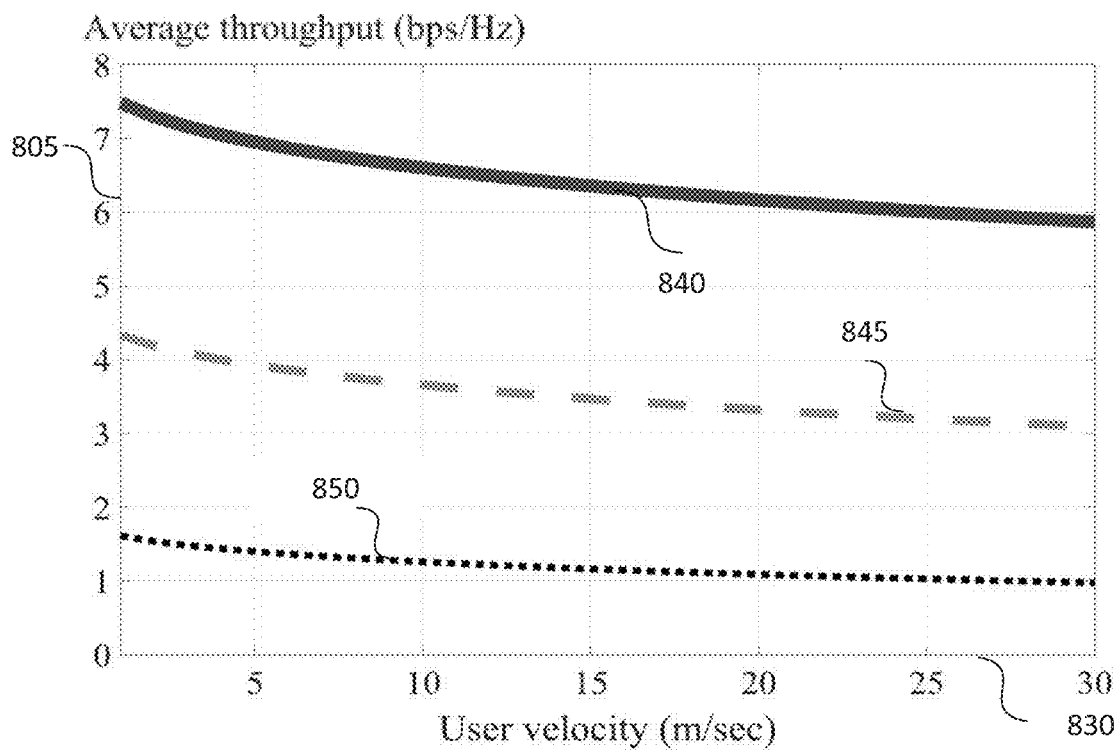
FIG. 11 is a block diagram illustrating average throughput as a function of user velocity, in accordance with the present invention.

Referring now to FIG. 11, average throughput as a function of user velocity is illustratively depicted in accordance with an embodiment of the present invention.

FIG. 11 illustrates the optimized average throughput $\hat{R}(1, D^*)$ 805 as a function of maximum user velocity v max (830) for different values of transmit power P (20 dBm (curve 840), 10 dBm (curve 845) and 0 dBm (curve 850)). According to Equation (4), AUR 220 expands faster for higher values of v max. Consequently, the BS 110 is required to perform location probing more frequently to avoid low beamforming gains. However, this increases beam tracking overhead leading to a lower average throughput.

Figure 12:
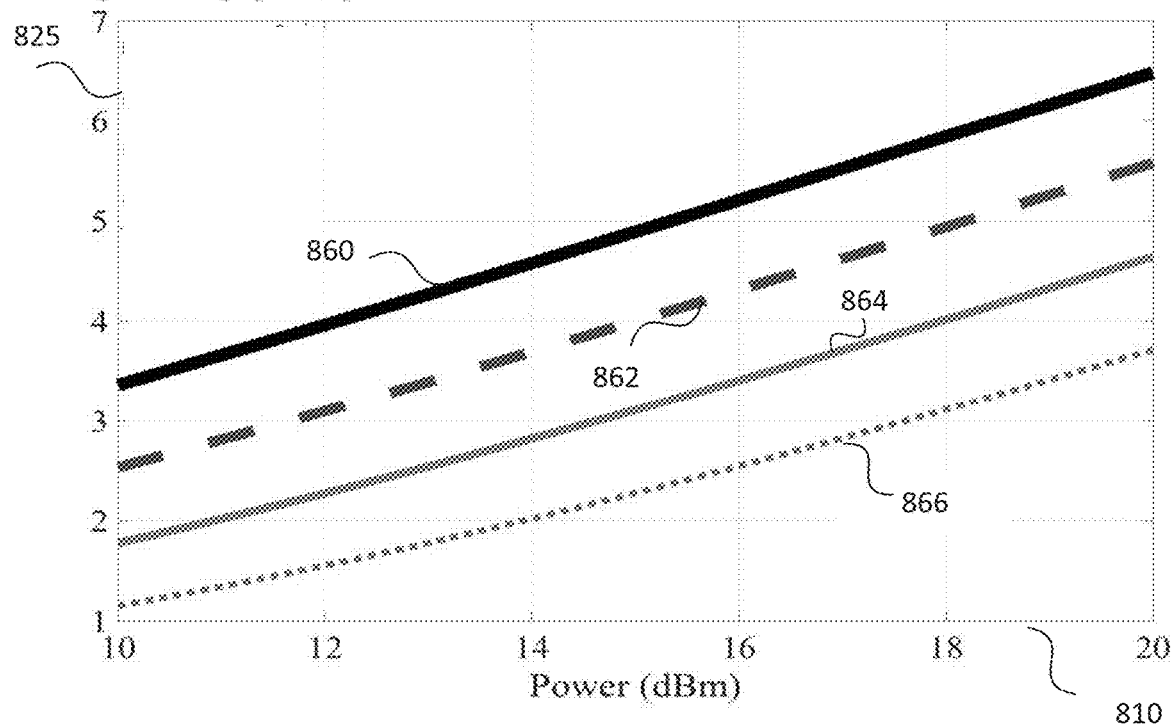
FIG. 12 illustrates average throughput as a function of transmit power when the beamwidth is constrained, in accordance with an embodiment of the present invention.

FIG. 12 illustrates average throughput as a function of transmit power when the beamwidth is constrained, in accordance with an embodiment of the present invention.

FIG. 12 illustrates, for a system in which the number of antennas is limited, a plot of the average throughput as a function of transmit power when the beamwidth is constrained to be larger than $\theta_{min} \in \{2°, 4°, 8°, 16°\}$. Each of the $\theta_{min} \in \{2°, 4°, 8°, 16°\}$ are represented by, respectively, curves 860 (thicker line), 862 (larger spaced broken line), 864 (thinner line), and 866 (smaller spaced broken line). A larger $\theta_{min}$ restricts the beamforming gain more leading to a lower average throughput as expected. Furthermore, adding 3 dB to the transmit power can approximately compensate for the throughput loss incurred by doubling the minimum beamwidth.

Figure 13:
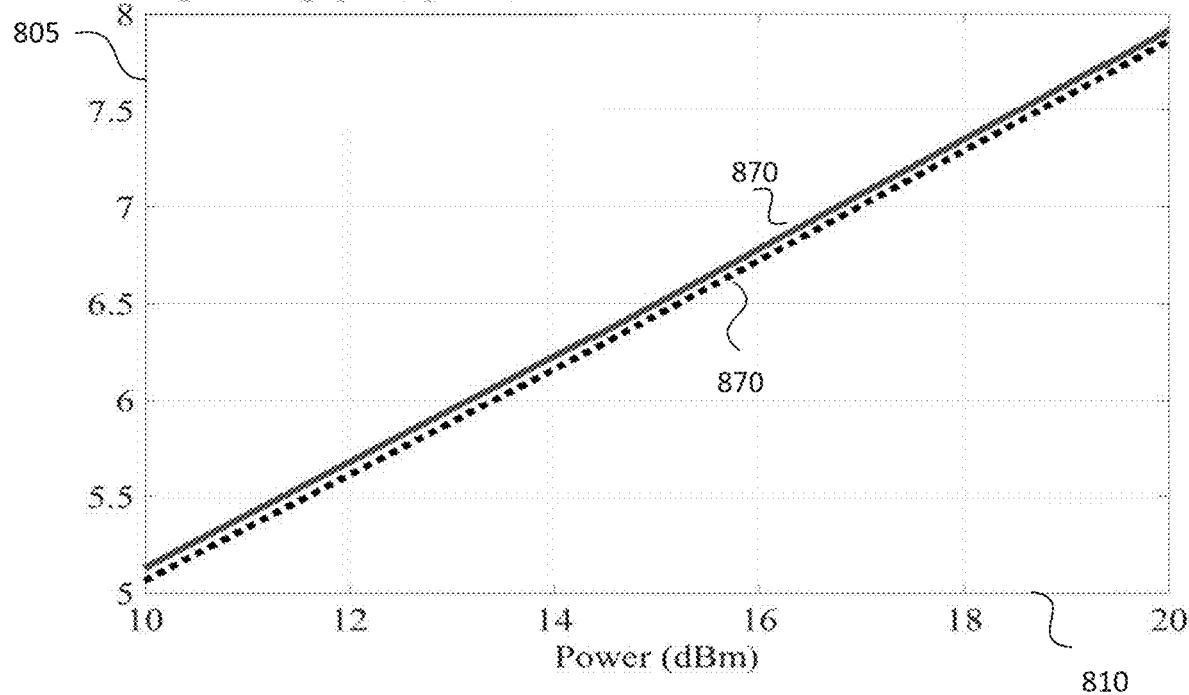
FIG. 13 is a block diagram illustrating actual average throughput versus approximated average throughput, in accordance with the present invention.

Referring now to FIG. 13, an actual average throughput versus approximated average throughput is illustratively depicted in accordance with an embodiment of the present invention.

According to an example scenario, both LPP 310 and DCP 320 are time-slotted and the beam pattern can only be modified at the beginning of each time-slot with duration $\tau$. FIG. 13 illustrates the actual average throughput (870) as defined in Equation (20) and an approximation of the actual average throughput (875) as provided by Equation (19) while considering v max=10 m/sec. The approximation error is small since $\tau$ is relatively small.

Tracking a mobile user is an inevitable task in mmWave systems where narrow transmission patterns are utilized to overcome high pathloss and severe shadowing. In the example embodiments disclosed herein, a joint beam tracking and data communication scheme in which time is divided into frames (where each frame consists of two phases: i) location probing, and ii) data communication) is provided. In the first phase, the BS 110 performs onward fractional search to localize the mobile device 120 by transmitting probing and updates knowledge about the user location based on the user feedback. In the second phase, the BS 110 matches a transmission pattern to the shortest angular region which the BS 110 is sure the mobile device 120 is located in and starts data transmission while expanding the transmission beamwidth over time to maintain the connection.

Figure 14:
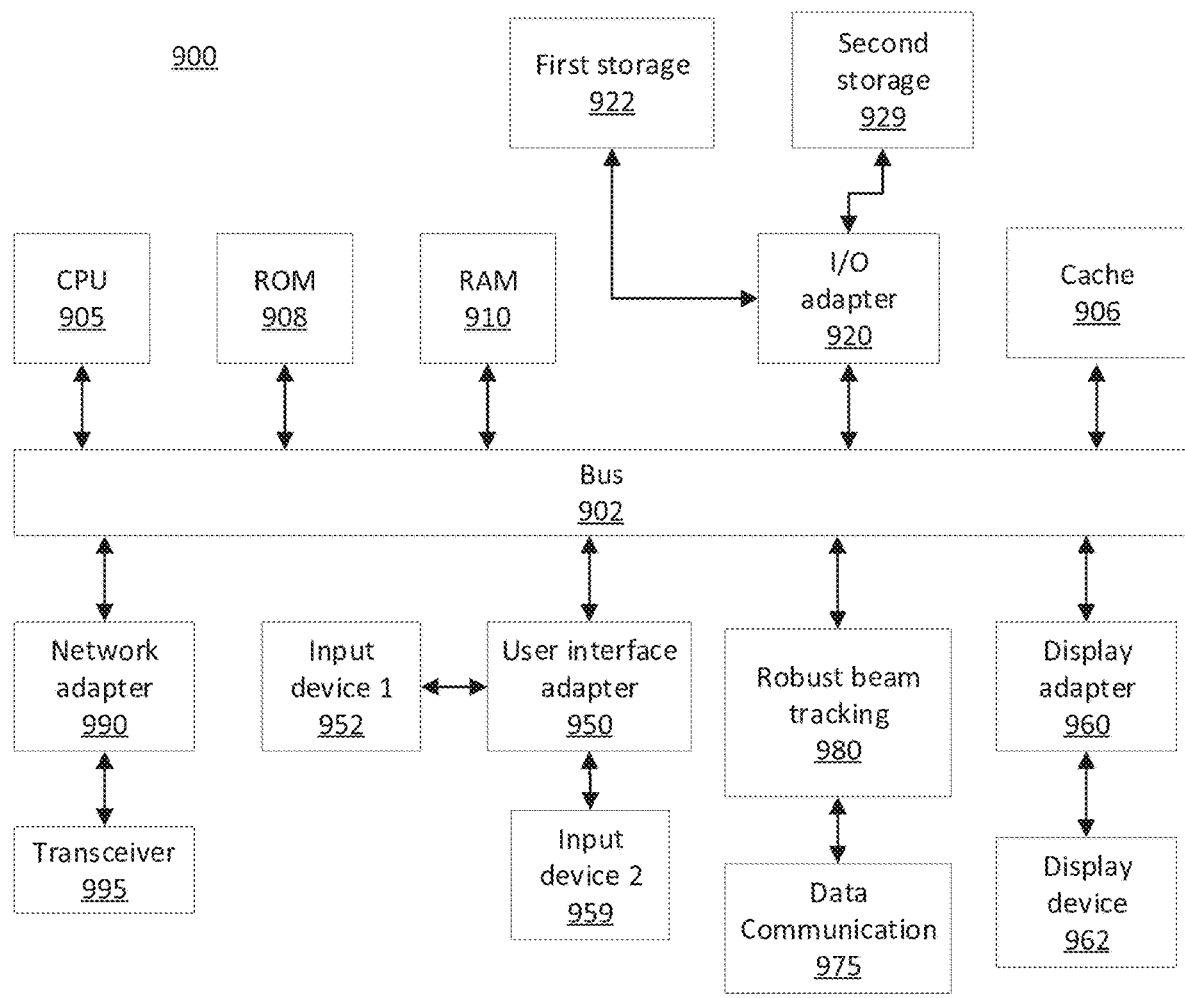
FIG. 14 is a schematic and block diagram illustrating a high-level system for robust beam tracking and data communication in millimeter-wave mobile networks, in accordance with the present invention.

Referring now to FIG. 14, an exemplary computer system (e.g., a server or a network device) for system anomaly detection based on retrieving a set of most similar logs is shown in accordance with an embodiment of the present invention. The computer system 900 includes at least one processing device (CPU) 905 operatively coupled to other components via a system bus 902. A cache 906, a Read Only Memory (ROM) 908, a Random-Access Memory (RAM) 910, an input/output (I/O) adapter 920, a network adapter 990, a user interface adapter 950, a robust beam tracking component 980 and a display adapter 960, can be operatively coupled to the system bus 902.

A first storage device 922 and a second storage device 929 can be operatively coupled to system bus 902 by the I/O adapter 920. The storage devices 922 and 929 can be any of a disk storage device (e.g., a magnetic or optical disk storage device), a solid-state magnetic device, and so forth. The storage devices 922 and 929 can be the same type of storage device or different types of storage devices. Either or both of the storage devices 922 and 929 can be configured to operate as a data store or database to store various logs of system events (e.g., heterogeneous logs). Robust beam tracking component 980 can include software and/or hardware as described herein.

A transceiver 995 can be operatively coupled to system bus 902 by network adapter 990. A display device 962 is operatively coupled to system bus 902 by display adapter 960. Data communication component 975 can be operatively coupled to system bus 902 directly or indirectly, for example via robust beam tracking component 980. Robust beam tracking component 980 implements robust beam tracking and data communication (for example, via data communication component 975). Robust beam tracking component 980 divides time into frames, each consisting of two phases: i) location probing in which a fractional search policy is implemented to localize the user, and ii) data communication in which the base station starts data communication with the user while expanding the beamwidth.

A first user input device 952 and a second user input device 959 can be operatively coupled to system bus 902 by user interface adapter 950. The user input devices 952 and 959 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used in accordance with the present invention. The user input devices 952 and 959 can be the same type of user input device or different types of user input devices. The user input devices 952 and 959 can be used to input and output information to and from system 900.

Other embodiments of the present invention can optionally include further processing units including a graphics processing unit ("GPU"), a mother board, or alternatively/additionally another storage medium, an operating system, one or more application software, as well as including one or more communication interfaces (e.g., RS232, Ethernet, Wi-Fi, Bluetooth, USB). Useful examples of computing devices optionally included in or integrable with embodiments of the present invention include, but are not limited to, personal computers, smart phones, laptops, mobile computing devices, tablet PCs, and servers. In accordance with embodiments of the present invention, an event record log source can be a computer storage medium.

Of course, the computer system 900 can also include other elements (not shown), as readily contemplated by one of skill in the art, as well as omit certain elements. For example, various other input devices and/or output devices can be included in computer system 900, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 900 are readily contemplated by one of ordinary skill in the art given the teachings of the present invention provided herein.

It should be understood that multiple computing devices can be operably linked to form a computer network in a manner as to distribute and share one or more resources, such as clustered computing devices and server banks/farms. In embodiments of the present invention each of the aforementioned elements (e.g., device, medium, source, or module) can be directly or indirectly communicably connected (e.g., via a wireless a wired electronic connection) to at least one other element of the system. As described in more detail below, some embodiments of the present invention can be wholly contained within a single computing device. Other embodiments, however, can encompass a plurality of interconnected or networked devices and resources.

Figure 15:
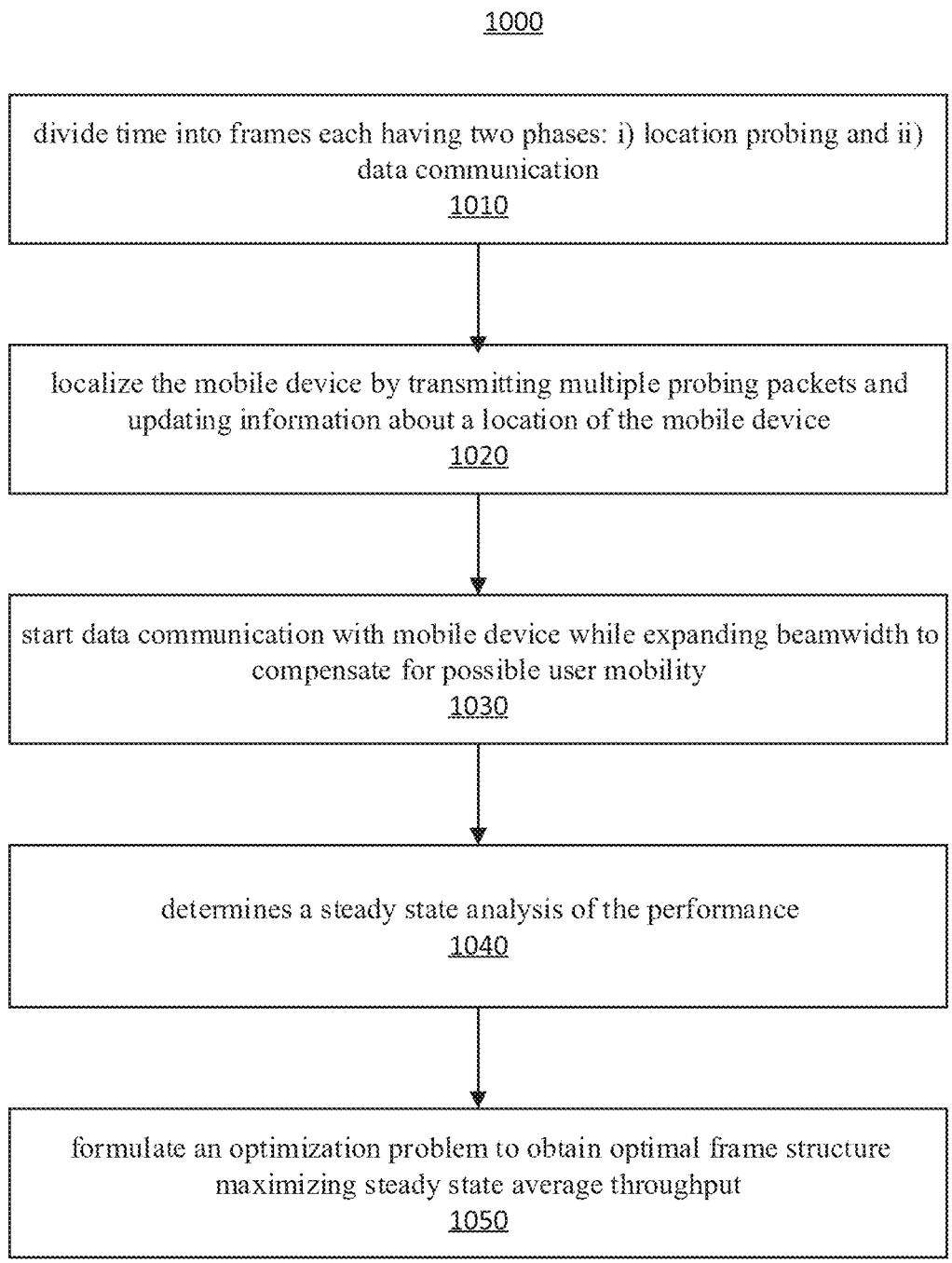
FIG. 15 is a flow diagram illustrating a system/method for robust beam tracking and data communication in millimeter-wave mobile networks, in accordance with the present invention.

Referring now to FIG. 15, a method 1000 for robust beam tracking and data communication is illustratively depicted in accordance with an embodiment of the present invention.

At block 1010, BS 110 divides time into frames each consisting of two phases: i) location probing and ii) data communication.

At block 1020, in the location probing phase, BS 110, uses a fractional search policy to localize the mobile device 120 by transmitting multiple probing packets over different time-slots and updating information (for example, stored by the stations 110) about a location of the mobile device 120 based on the feedback from the mobile device 120.

At block 1030, in the data communication phase, BS 110 starts data communication with the mobile device 120 while expanding the beamwidth to compensate for possible user mobility.

At block 1040, BS 110 determines a steady state analysis of the performance, for example as described with respect to FIG. 5 herein above.

At block 1050, BS 110 formulates an optimization problem to obtain optimal frame structure maximizing steady state average throughput.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for robust beam tracking and data communication, comprising:
    dividing, by a base station, time into frames each having two phases, a location probing phase and a data communication phase;
    determining a steady state analysis of the performance of beam tracking by the base station;
    formulating an optimization problem to obtain optimal frame structure maximizing steady state average throughput;
    in the location probing phase, using a fractional search policy to localize at least one mobile device by transmitting multiple probing packets over different timeslots and updating information about a location of the at least one mobile device; and
    in the data communication phase, communicating with the at least one mobile device while expanding a beamwidth to compensate for possible mobility of the at least one mobile device.

2. The method as recited in claim 1, wherein details of a mobility model of the at least one mobile device are not available to the base station.

3. The method as recited in claim 1, wherein updating the information about the location of the at least one mobile device comprises updating the information about the location of the at least one mobile device based on the feedback from the at least one mobile device.

4. The method as recited in claim 1, further comprising obtaining an optimal data communication duration using quasi-concave programming.

5. The method as recited in claim 1, wherein an optimal location probing duration of one timeslot is used for location probing.

6. The method as recited in claim 1, further comprising:
    estimating a maximum user velocity and a distance between the at least one mobile device and the base station using at least one of global positioning system (GPS) or low frequency channels.

7. The method as recited in claim 1, further comprising:
    determining an angular uncertainty region (AUR) on a location of the at least one mobile device; and
    matching a transmission pattern to the AUR.

8. The method as recited in claim 1, further comprising:
    localizing the at least one mobile user intermittently to enable use of predetermined narrow beams while maintaining a connection to a predetermined reliability.

9. The method as recited in claim 1, further comprising:
    in the location probing phase, at a beginning of each time-slot, transmitting a probing packet while matching an angular coverage region to a fraction of an angular uncertainty region (AUR) at an end of the each timeslot.

10. The method as recited in claim 9, wherein the AUR is updated based on feedback which is either an acknowledgement packet (ACK) that identifies that the at least one mobile device has been in the angular coverage region or no packet (NACK) is interpreted as the at least one mobile device not having been in the angular coverage region.

11. A computer system for robust beam tracking and data communication, comprising:
    a processor device operatively coupled to a memory device, the processor device being configured to:
    divide, by a base station, time into frames each having two phases, a location probing phase and a data communication phase;
    determine a steady state analysis of the performance of beam tracking by the base station;
    formulate an optimization problem to obtain optimal frame structure maximizing steady state average throughput;
    in the location probing phase, use a fractional search policy to localize at least one mobile device by transmitting multiple probing packets over different timeslots and update information about a location of the at least one mobile device; and in the data communication phase, communicate with the at least one mobile device while expanding a beamwidth to compensate for possible mobility of the at least one mobile device.

12. The system as recited in claim 11, wherein, when updating the information about the location of the at least one mobile device, the processor device is further configured to:

update the information about the location of the at least one mobile device based on the feedback from the at least one mobile device.

13. The system as recited in claim 11, wherein the processor device is further configured to:

obtain an optimal data communication duration using quasi-concave programming.

14. The system as recited in claim 11, wherein an optimal location probing duration of one timeslot is used for location probing.

15. The system as recited in claim 11, wherein the processor device is further configured to:

estimate a maximum user velocity and a distance between the at least one mobile device and the base station using at least one of global positioning system (GPS) or low frequency channels.

16. The system as recited in claim 11, wherein the processor device is further configured to:

determine an angular uncertainty region (AUR) on a location of the at least one mobile device; and
match a transmission pattern to the AUR.

17. The system as recited in claim 11, wherein the processor device is further configured to:

transmit to the at least one mobile device with an average throughput of:

$$\hat{R} = \frac{1}{D+K} \sum_{m=K}^{D+K} \log_2\left(1 + \frac{A}{u_K + 2\Delta(m-K)}\right),$$

wherein $\hat{R}$ is an average throughput in steady state, D is a unit of time for data communication, K is a unit of time for location probing, m is a desgn parameter, and $u_k$ is a function of K and D.

18. A computer program product for robust beam tracking and data communication, the computer program product comprising a non-transitory computer readable storage medium having program instructions embodied therewith, the program instructions executable by a computing device to cause the computing device to perform the method comprising:

divide, by a base station, time into frames each having two phases, a location probing phase and a data communication phase;
determine a steady state analysis of the performance of beam tracking by the base station;
formulate an optimization problem to obtain optimal frame structure maximizing steady state average throughput;
in the location probing phase, use a fractional search policy to localize at least one mobile device by transmitting multiple probing packets over different timeslots and update information about a location of the at least one mobile device; and
in the data communication phase, communicate with the at least one mobile device while expanding a beamwidth to compensate for possible mobility of the at least one mobile device.

* * * * *